Nov. 3, 1970  M. MONTAG  3,537,271
LEVEL CONTROL FOR CRYOGENIC LIQUIDS
Filed Aug. 8, 1968
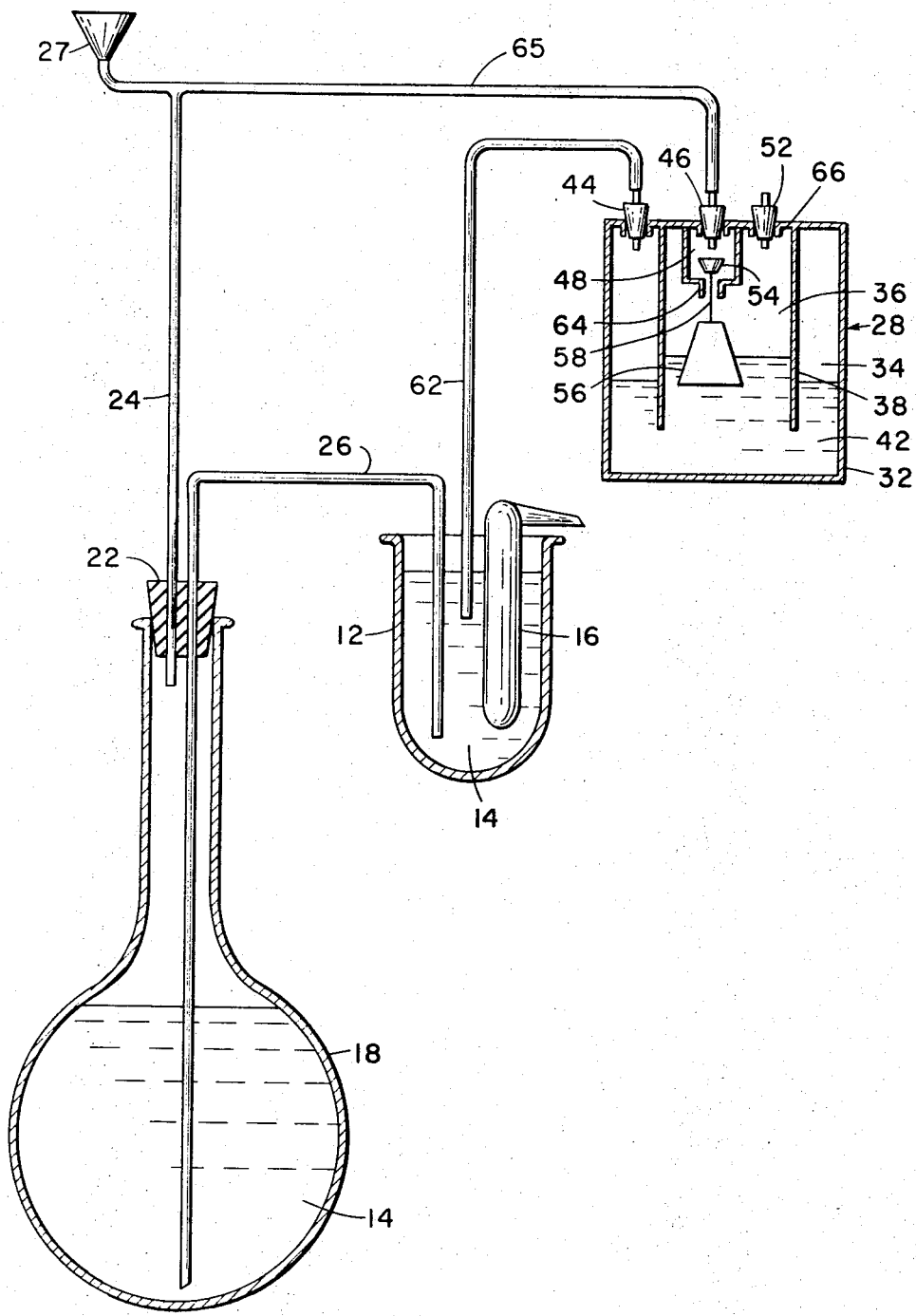
INVENTOR.
MORDECHAI MONTAG
BY United States Patent Office 3,537,271
Patented Nov. 3, 1970

3,537,271
LEVEL CONTROL FOR CRYOGENIC LIQUIDS
Mordechai Montag, Plainview, N.Y., assignor to the United States of America as represented by the United States Atomic Energy Commission
Filed Aug. 8, 1968, Ser. No. 751,101
Int. Cl. F17c 7/02
U.S. Cl. 62—55                                      3 Claims

ABSTRACT OF THE DISCLOSURE

A control system for maintaining automatically the level of a cryogenic liquid in an open container. A closed storage vessel utilizes the vapor pressure of the cryogenic liquid to pump the liquid into the open container. A regulator uses a level sensing pipe extending into the open container to increase pressure within a sealed chamber as the level rises in the container, relying on a rising level of a control liquid to vent the storage vessel thereby stopping flow when the level reaches a predetermined value.

BACKGROUND OF THE INVENTION

One of the current important uses of cryogenic liquids is that of a cold trap in connection with a chemical system. Typically the cryogenic liquid, which may be liquid nitrogen, for example, is maintained in an open-top container. In this way, the container is readily available for immediate use by merely immersing the cold trap into the vessel, and in fact, more than one cold trap can be maintained at any one time.

One of the disadvantages or drawbacks of utilizing an open vessel of cryogenic liquid is the evaporation of liquid which takes place and steadily lowers the level in the vessel. This ordinarily requires constant attention to bring the level up by refilling and to insure that the traps are immersed at all times.

SUMMARY OF THE INVENTION

The invention described herein was made in the course of, or under a contract with the United States Atomic Energy Commission.

This problem is overcome in accordance with the present invention by providing a unique automatic arrangement for maintaining the open vessel with the proper level of cryogenic liquid at all times. A regulator is provided which automatically adds liquid to the open container whenever the level drops below a predetermined point.

The objects and advantages of this invention will hereinafter become obvious from the following description of a preferred embodiment of this invention taken with reference to the accompanying drawing.

BRIEF DESCRIPTION OF THE DRAWING

The figure illustrates a schematic arrangement embodying the principles of this invention.

DESCRIPTION OF THE PREFERRED EMBODIMENT

Referring to the figure, open container 12 contains a cryogenic liquid 14 which may be nitrogen into which is immersed a cold trap 16. As is understood in the art, trap 16 would be part of a chemical system not shown and not forming a part of this invention.

The purpose of the arrangement hereinafter described as to maintain the level of liquid 14 within a predetermined range, adding liquid to compensate for losses due to evaporation, etc.

Make-up for container 12 is from a storage vessel 18 having a stopper 22 through which passes a vent pipe 24 and a transfer pipe 26 which extends from a point close to the bottom of storage vessel 18 into container 14 to some convenient point as shown. Transfer pipe 26 as well as storage vessel 18 would preferably be insulated.

A regulator 28, the details of which are not a part of this invention and which is covered by my U.S. patent application Ser. No. 616,431, filed Feb. 13, 1967, consists of a fully enclosed housing 32 containing an outer, annular chamber 34 and an inner chamber 36 formed by a cylindrical tube 38 extending down from the top of housing 32 as shown. Housing 32 is filled partially with a suitable control liquid 42 such as a silicone oil.

The top of housing 32 is provided with tubular fittings 44 in the outer chamber, 46 in auxiliary formed chamber 48 in inner chamber 36, and 52 in inner chamber 36. Auxiliary chamber 48 is closed off at the bottom thereof by a stopper 54 forming a valve.

Within inner chamber 36 is a float 56 from which extends an arm 58 through tubular guide 64 to and attached to stopper 54. As float 56 rises, arm 58 will raise stopper 54 and thereby open communication into chamber 48. When the level of liquid 42 in inner chamber 36 is low, or drops, stopper 54 will close the opening and float 56 will be supported by stopper 54. A level sensing tube 62 extends from a point within container 12 at just below the lowest desired level of liquid 14 to and through tubular fitting 44. A vent tube 65 extends from tubular fitting 46 to joint with vent tube 24 at safety vent valve 27, to prevent excessive pressures from developing in the system. Tubular fitting 52 exposes the space within chamber 36 to ambient pressure.

In the operation of the apparatus just described, initially, container 12 is empty. Pressure within storage vessel 18 will start to pump liquid 14 through transfer tube 26 into vessel 12. When the bottom opening into level sensing tube 62 becomes covered by the rising level of liquid 14 in container 12, trapped air or gas within outer chamber 34 will gradually be compressed, the pressure rising. Float 56 will begin to float and hence raise stopper 54, venting inner chamber 48 and hence vessel 18 to ambient pressure within chamber 36, with the consequence that pumping of liquid will cease. Whenever the level of liquid 14 in container 12 drops by an appropriate amount depending on the parameters of the system, refilling will take place, as already described, in effect maintaining the level of liquid 14 in open container 12 within a fairly narrow range, keeping cold trap 16 properly immersed without personal attention.

It is thus seen there has been provided a simple and reliable system for maintaining automatically the level of a cryogenic liquid in an open container. While only a preferred embodiment of the invention has been described, it is understood that many variations thereof are possible without departing from the principles of this invention as defined on the accompanying claims.

What is claimed is:
1. A control system for maintaining the level of a cryogenic liquid within an open container, comprising:
   (a) closed storage vessel means containing make-up liquid under pressure for said container;
   (b) tube means to transfer liquid from said storage vessel means to said container, said liquid being transferred under pressure within said storage vessel means;
   (c) regulator means having first and second chambers, and liquid level means for balancing pressures between the aforesaid chambers, the second chamber being vented to ambient pressure;
   (d) said regulator means having further means for pressurizing said first chamber when the level of liquid within said container means reaches a predetermined value;

(e) said regulator means having flotation controlled value means to expose said second chamber to the pressure within said closed storage vessel means when the pressure within said first chamber becomes pressurized to a predetermined value, thereby venting said closed storage vessel means and terminating flow of make-up liquid into said container.

2. The control system of claim 1 in which the further means for pressurizing said first chamber includes a tube extending from said first chamber down into said open container, the opening into said tube being within said container, the rising level of liquid in said container closing said opening causing the pressure to rise within said first chamber.

3. The control system of claim 2 in which the flotation controlled valve means to expose said second chamber to said storage vessel means includes a connecting pipe, said connecting pipe having a vent pipe to release excess pressures within said system.

References Cited
UNITED STATES PATENTS

| | | | |
|---|---|---|---|
| 3,307,367 | 3/1967 | Klepping | 62—55 X |
| 3,320,970 | 5/1967 | McHenry | 137—403 |

ALAN COHAN, Primary Examiner

U.S. Cl. X.R.

137—210